May 1, 1923.

J. G. VINCENT

MOTOR VEHICLE

Original Filed Jan. 31, 1916   3 Sheets-Sheet 1

1,453,646

INVENTOR
Jesse G. Vincent,
BY Foster, Freeman,
Watson & Coit,
ATTORNEYS.

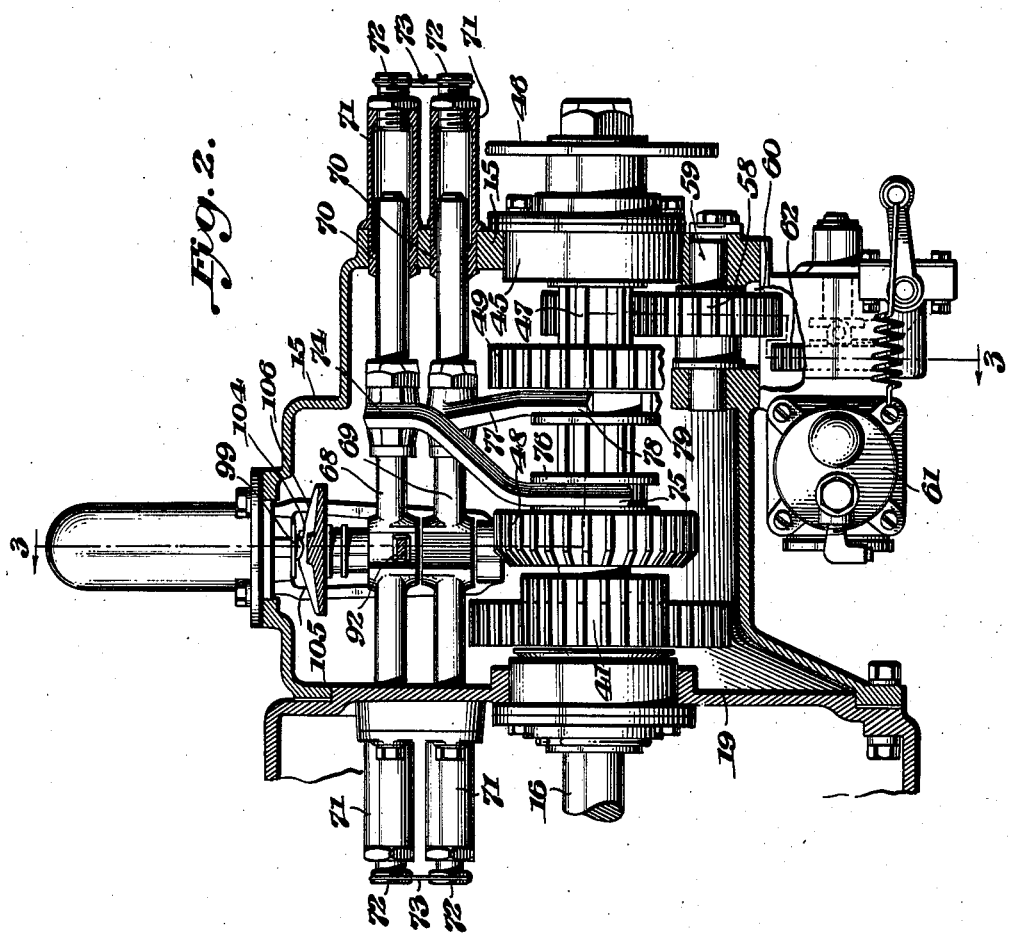

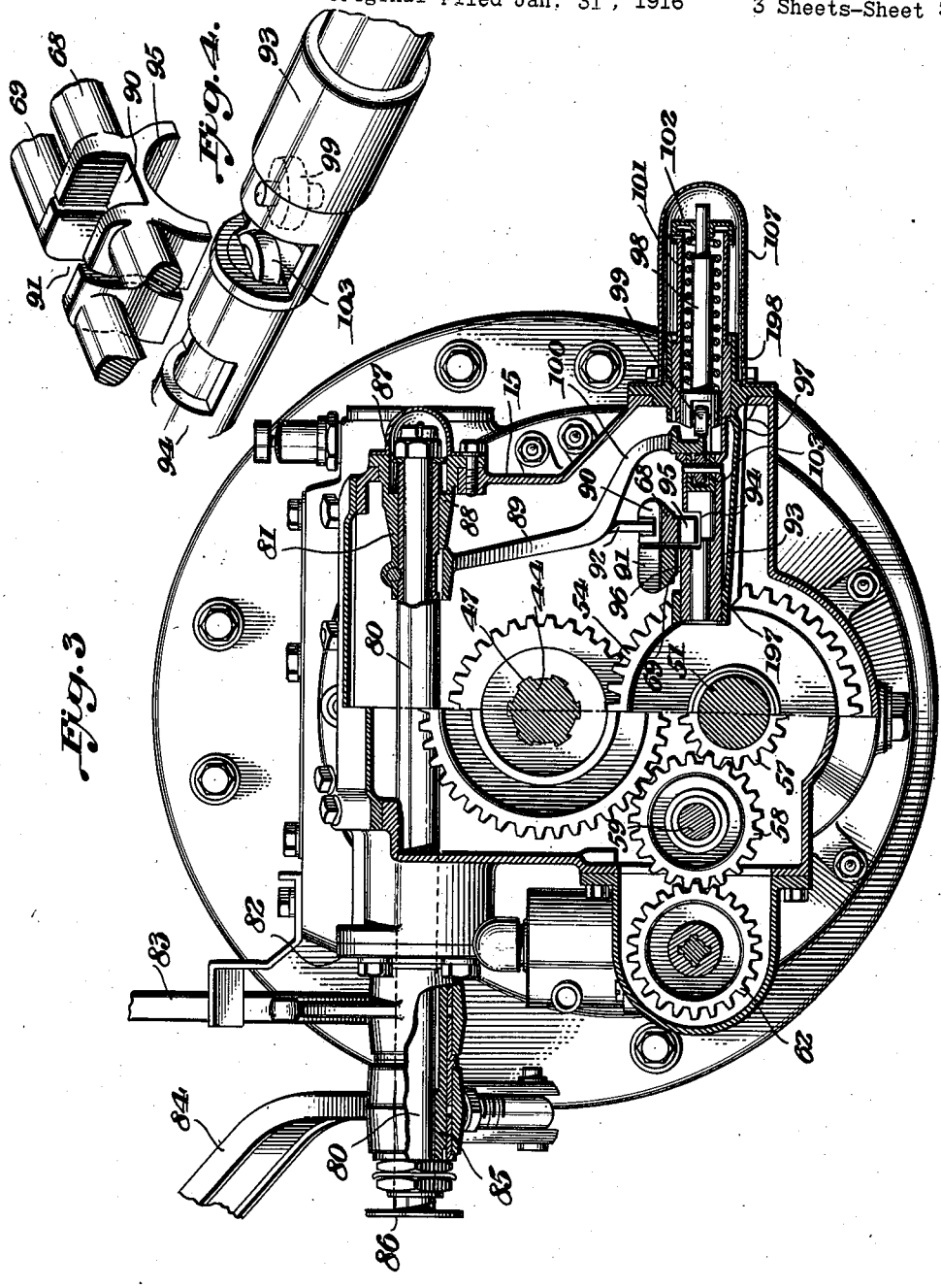

Patented May 1, 1923.

1,453,646

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Original application filed January 31, 1916, Serial No. 75,414. Divided and this application filed November 27, 1918. Serial No. 264,436.

*To all whom it may concern:*

Be it known that I, JESSE G. VINCENT, a citizen of the United States, and residing at Detroit, Wayne County, State of Michigan, have invented certain new and useful Improvements in Motor Vehicles, of which the following is a specification.

This application which is a division of my application Number 75,414 filed January 31, 1916, Patented March 18, 1919, No. 1,297,755, relates to motor vehicles and more particularly to the transmission mechanism thereof.

The principal objects of the invention are to provide a simple and dependable mechanism for shifting the gears of the transmission; to provide a device cooperating with the shifter actuating mechanism for the purpose of aiding in shifting the gears and yieldingly holding them in selected positions; and to provide such a device which is constructed and arranged so that it may be assembled in the transmission or removed therefrom as a unit. Other objects and features of novelty will be apparent from the description taken in connection with the drawings, in which:—

Figure 2 is a longitudinal sectional plan of the transmission;

Figure 3 is a transverse sectional elevation taken substantially on the line 3—3 of Figure 2; and Figure 4 is a perspective view illustrating the details of the shifting and locking devices, the parts being separated somewhat to better illustrate their construction.

Figure 1:
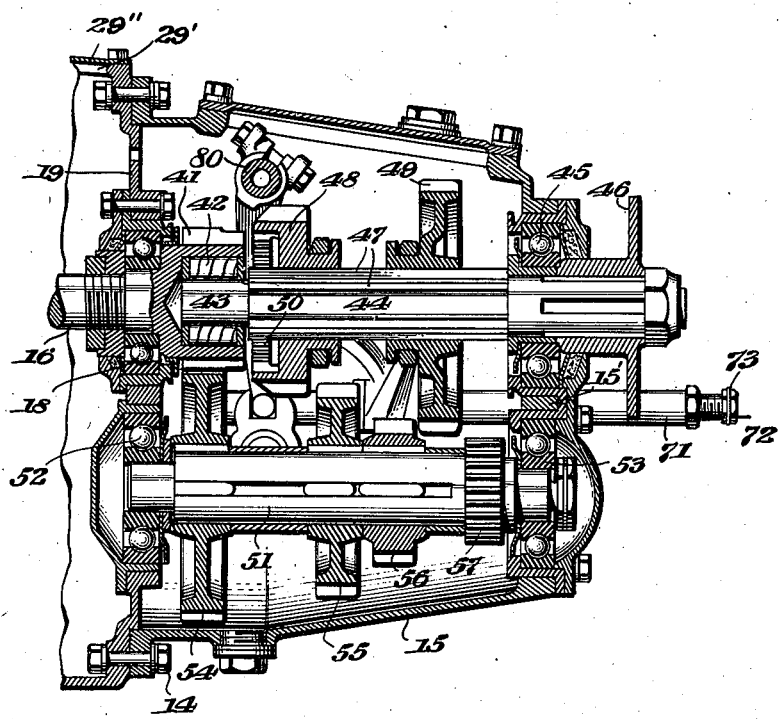
Figure 1 is a longitudinal sectional elevation through a transmission mechanism constructed in accordance with the present invention.

Referring to the drawings the reference numeral 15 indicates the gear or transmission casing which in the form shown has its open front end closed by the wall 19 of a clutch casing. The driving shaft and countershaft of the transmission are supported in bearings in the wall 19 and the rear wall 15, as will be described hereinafter. In the form of the invention illustrated the rearward end of the clutch shaft 16 is enlarged within the casing 15 and provided with gear teeth 41 on the exterior of said enlargement. This enlarged end is cupped out to receive a bearing 42 which supports the end 43 of the gear shaft 44, the rearward end of this shaft being supported in a bearing 45 in the rear wall of the transmission casing. Exteriorly of the casing the shaft 44 is provided with a flange 46 to which a universal joint or other suitable form of connection may be attached. The shaft 44 is preferably provided with a plurality of keys 47 and has gears 48 ad 49 slidably mounted thereon. The gear 48 has internal teeth 50 adapted to mesh with the teeth 41 to form a direct connection between the shafts 16 and 44. The countershaft 51 is mounted in the bearings 52 and 53 and has keyed thereon a gear 54 which constantly meshes with the teeth 41. The countershaft 51 also has keyed thereon gears 55, 56 and 57, the gear 48 being mounted to slide into mesh with the gear 55 and the gear 49 being mounted to be moved into mesh with the gear 56. An intermediate gear 58 is mounted on the short shaft 59 (see Figure 2) and meshes with the gear 57. The gear 49 is adapted to be moved into mesh with the gear 58 so that the shaft 44 may have its direction of rotation reversed from that of shaft 16.

The casing 15 is provided with an opening 60 in the side thereof through which a gear 58 slightly projects and a pump 61 is secured on the exterior of the casing 15 and operated by a shiftable gear 62 which is arranged to be driven from the gear 58. The arrangement of this pump and the means for driving the same form no part of the present invention and are claimed in my co-pending application, Serial No. 264,435, filed November 27, 1918.

For the purpose of shifting the gears 48 and 49 into and out of mesh with their cooperating gears, two shiftable elements 68 and 69, preferably in the form of rods, are mounted to move parallel with the axis of the shaft 44. These rods have their ends mounted in bearings in the front and rear walls of the gear casing, two of these bearings being indicated at 70 in Figure 2. The ends of the rods 68 and 69 are enclosed in tubes 71 and these tubes have arranged in the outer ends thereof adjustable plugs 72 which are adapted to be engaged by the ends of the rods 68 and 69 to limit their movement. Any suitable means may be provided for securing the plugs 72 in position and for this purpose locking wires 73 are shown.

The rod 68 has secured thereon an arm 74 having a yoke 75 at its end which engages the grooved hub 76 of the gear 48. The rod 69 has secured thereon an arm 77 having a yoke 78 at its end which engages the grooved hub 79 of the gear 49. The gears 48 and 49 are thus operatively connected with the rods 68 and 69 respectively and partake of the movements of the latter. A shaft 80 is arranged in the upper part of the casing 15 and mounted in suitable bearings 81 and 82 which are secured to the side walls of the casing. A brake pedal 83 and a clutch pedal 84 are mounted on the tubular extension 85 of the bearing 82. The shaft 80 projects beyond the outer end of the tubular extension 85 and is provided with a flange 86 at its outer end, with which a suitable actuating lever commonly known as the gear shift lever, may be connected. The shaft 80 is arranged to be moved axially in the bearings 81 and 82 and carries on one end a washer or plate 87 which is adapted to engage an abutment 88 to limit the axial movement of the shaft in one direction. An arm 89 is secured on the shaft 80 and has its lower end arranged to co-operate with the rods 68 and 69, these rods being provided with transverse grooves 90 and 91, respectively, into which the end 92 of the arm 89 is adapted to project. When the rods 68 and 69 are in their neutral positions the grooves 90 and 91 are in alinement so that the end 92 of the arm 89 may be shifted from the groove 90 to the groove 91 or vice versa. From Figure 3 it will be evident that by rocking the shaft 80 the rod 68 may be shifted, and when the shaft 80 is shifted axially to move the end 92 of the arm 89 into the groove 91 of the rod 69 the latter will be shifted by rocking the shaft 80. On account of the grooves 90 and 91 being in alinement only when the rods 68 and 69 are in their neutral positions, it is evident that the connection between the arm 89 and the rods may be shifted only when the rods and the gears which they actuate are in their neutral positions.

It is desirable to secure one of the rods 68, 69 against movement when the other rod is operatively connected with the arm 89 in order to prevent the accidental shifting of the rods, and for this purpose there is provided a locking bolt 93. This bolt is arranged to move transversely of the rods 68 and 69 and is provided in its upper side with a groove 94 through which either of these rods may be moved when operatively connected with the arm 89. The rods 68 and 69 are provided with grooves 95 and 96, respectively, which are in alinement when the rods are in their neutral positions and through which the bolt 93 may be moved. The bolt 93 is wholly supported by a member or bracket 97 which is detachably secured to the side wall of the casing 15. Said bracket has spaced bearing parts 197 and 198 in which the bolt slides, being secured against turning in any suitable manner. The bolt is preferably of tubular form and has slidably arranged in its outer end a plunger 98, the inner end of which carries a roller 99 cooperating with the lower end of an extension 100 of the arm 89. The plunger 98 is normally pressed inwardly by a spring 101, which cooperates with the inner end of the plunger and with a cap 102 secured on the outer end of the bolt 93. The bolt 93 carries a roller 103 which cooperates with the roller 99 to cause the bolt to be moved with the axial movements of the shaft 80. In the drawings the parts are shown in the neutral position and from Figure 2 it will be seen that the lower end of the extension 100 is of triangular cross section and provided with a recess 104, which receives the roller 99 to hold the parts in their neutral positions. When the shaft 80 is rocked, the roller 99 leaves the recess 104 and cooperates with the edge 105 or 106 of the extension 100 to assist the operator in rocking the shaft 80 and thereby sliding the gears into meshing position and to yieldingly hold them in such positions. From Figure 3 it will be evident that when the bolt 93 is shifted inwardly from the position shown, the groove 94 in the bolt will be moved into alinement with the rod 69 and the bolt will secure the rod 68 against movement. At the same time the end 92 of the arm 89 is shifted from the groove 90 to the groove 91, so that when the shaft 80 is rocked the rod 69 will be actuated. The outer end of the bolt is enclosed in a suitable cap or casing 107.

The drawings illustrate what is now considered the preferred form of the invention, but it will be understood by those skilled in the art that various changes may be made in the details without departing from the spirit of the invention as defined in the appended claims.

Having thus described the invention what is claimed as new and desired to be secured by Letters Patent is:—

1. In a mechanism of the class described, the combination of a plurality of rectilinearly shiftable elements arranged side by side and having transverse grooves therein, a member pivotally mounted for rocking movement having two arms and adapted to be moved axially of its pivot one arm traveling through said grooves to be operatively connected with said elements in succession, a locking bolt movable transversely of the direction of movement of said elements and cooperating with the latter to lock all of the elements except the one which is operatively connected with said member, the second arm engaging said bolt whereby the bolt is shifted when the member is moved axially of its pivot and spring means associated with said bolt to assist shifting said elements.

2. In mechanism of the class described, the combination of a plurality of shiftable elements arranged side by side and having transverse grooves therein on opposite sides thereof, a member pivotally mounted for rocking movement having two arms and adapted to be moved axially of its pivot one arm traveling through the grooves on one side of said elements to be operatively connected with said elements in succession, a locking bolt adapted to be arranged in the grooves on the opposite side of said elements and having a recess therein permitting one of the elements to be shifted while the others are locked the second arm on said member cooperating with said bolt and whereby the latter may be shifted and yielding means associated with said bolt to assist shifting said elements.

3. In a gear shifting mechanism, the combination of a casing having an opening through one of its walls, a sliding gear in said casing, a shiftable element connected to slide said gear from neutral to meshing position, a bracket removable through said opening and detachably secured to said casing, and a device wholly supported by said bracket for yieldingly moving said element toward gear meshing position.

4. In a gear shifting mechanism, the combination of a casing having an opening through one of its walls, a sliding gear in said casing, a shiftable element connected to slide said gear from neutral to meshing position, a bracket detachably secured to said casing, removable through said opening and having separated bearing parts, and a device for yieldingly moving said element toward gear meshing position slidably mounted in said bearing parts.

5. In a gear shifting mechanism, the combination of a casing having an opening through one of its walls, a plurality of shiftable elements in said casing, a member adapted to shift said elements one at a time, a locking bolt cooperating with said elements and said member and a single supporting bracket for said bolt, said bracket being removably secured to said casing and closing said opening.

6. In a gear shifting mechanism, the combination of a casing having an opening through one of its walls, sliding gears within said casing, a plurality of shiftable elements connected to slide said gears, a member adapted to shift said elements one at a time, a locking bolt cooperating with said elements and said member, and a supporting bracket wholly supporting said bolt, said bracket being detachably secured to said casing and removable as a unit through said opening.

7. In a gear shifting mechanism, the combination of a casing having an opening through one of its walls, sliding gears within said casing, a plurality of shiftable elements connected to slide said gears, a member adapted to shift said elements one at a time, a supporting bracket detachably secured to said casing over said opening projecting into the casing and having separated bearing parts, and a locking bolt slidably mounted in said parts cooperating with said elements and said member.

8. In a gear shifting mechanism, the combination of a casing having an opening through one of its walls, sliding gears within said casing, a plurality of shiftable elements connected to slide said gears, a member adapted to shift said elements one at a time, a supporting bracket removably secured to said casing over said opening and projecting into the casing having separated bearing parts, and a locking bolt slidably mounted in said parts, said bolt having portions intermediate its ends cooperating with said elements and said member.

9. As an article of manufacture, a gear shift locking device comprising, a bracket having means to be secured to a casing for gear shifting mechanism, a tubular member longitudinally slidable in said bracket, said tube having two transverse notches and a plunger within the tube spring pressed in the direction to project one end thereof across one of said notches.

In testimony whereof I affix my signature.

JESSE G. VINCENT.